(No Model.)

J. R. BROWN.
AUTOMATIC FIRE EXTINGUISHER.

No. 305,663. Patented Sept. 23, 1884.

WITNESSES:

INVENTOR:
Joseph R. Brown

UNITED STATES PATENT OFFICE.

JOSEPH R. BROWN, OF BRIDGEPORT, CONNECTICUT, ASSIGNOR TO THE AUTOMATIC FIRE EXTINGUISHER COMPANY, OF NEW YORK, N. Y.

AUTOMATIC FIRE-EXTINGUISHER.

SPECIFICATION forming part of Letters Patent No. 305,663, dated September 23, 1884.

Application filed April 7, 1883. (No model.)

*To all whom it may concern:*

Be it known that I, JOSEPH R. BROWN, of Bridgeport, county of Fairfield, and State of Connecticut, have invented a new and useful Improvement in Automatic Fire-Extinguishers; and I hereby declare the following to be a full, clear, and exact description of the same, reference being had to the accompanying drawings, forming part of this specification.

This invention has reference to an improvement in the construction of automatic fire-extinguishers; and it consists in the peculiar and novel device by which one or two outlets are closed, so as to resist the internal pressure, until, on the occurrence of a fire, the same are released by the action of heat on a fusible solder, as will be more fully set forth hereinafter.

In automatic fire-extinguishers as heretofore constructed the parts which are secured together by a fusible solder to restrain the action of the extinguisher until the breaking out of a fire would melt the solder have been secured so that the strain on the soldered surface was on a line with such surface, so that on the partial yielding of the solder the surfaces commenced to slide on each other, and such sliding, if arrested, would cause the extinguisher to leak. To prevent this creeping, I employ the solder simply to hold the two parts together surface to surface, which, on the melting of the solder, will separate without any movement of the surfaces upon each other.

Figure 1:
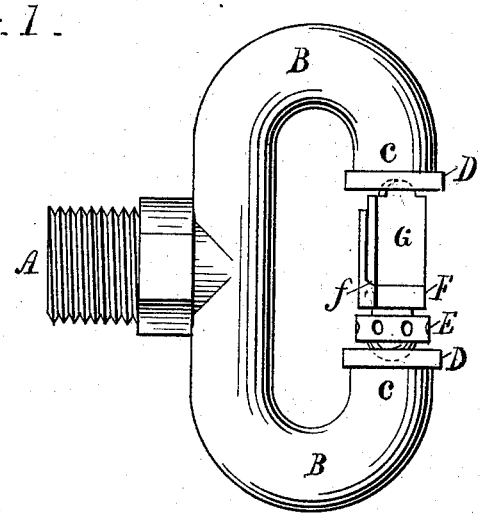
Figure 2:
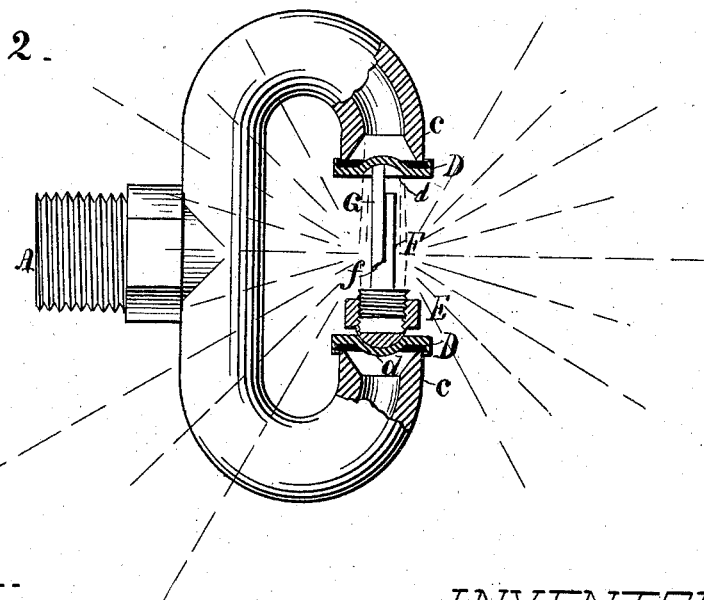

Figure 1 is a view of my improved automatic fire-extinguisher. Fig. 2 is a view of the same, partly in section.

In the drawings, A is the inlet, provided with a screw-thread by means of which it is secured in the usual branch-fitting of the pipes placed in the building to be protected, and connected with the water-supply. B B are two branches, ending in the discharge-outlets C C, placed opposite each other, so that the two streams issuing from the outlets will impinge against each other, and thus disperse the water in a fine spray over a large area. D D are caps by which the outlets C C are closed. They are preferably provided with a packing-ring, to insure a tight joint, and are provided with the central indentation, *d d*, in which the device for securing the caps rests. This device consists of the round-ended cup E, the interior of which is screw-threaded, and which is provided with holes into which a pin may be inserted to turn the cup E; or it may be made square or polyangular, so that a wrench can be applied. Screwed into the cup E is the post F, provided with the shoulder *f*, which shoulder is concaved, so as to form a firm bearing for the post G, which is secured to the post F by solder, the upper end of the post G bearing against the cap D and resting in the cavity *d*. By holding the posts F G and turning the cap E in one direction the whole device is elongated, and the caps D D are forced against the outlets, while by turning in the opposite direction the same are loosened. As long as the posts F G are held together by solder, the device will resist the internal pressure on the caps D D; but as soon as the solder is weakened by heat the joint is torn apart by the upsetting of the post F. The surfaces soldered do not slide in the least on each other, but are torn asunder as soon as the joint is sufficiently weakened by heat.

The device can be arranged to require a greater or less force to rupture the soldered joint by placing the post G at a greater or less angle with the post F. By this arrangement the caps D D are firmly held in place until the solder is weakened by heat, and the caps D D do not move in the slightest degree until the soldered joint is separated completely, thus preventing the possibility of a leak until the caps are entirely released and are removed by the internal pressure.

Having thus described my invention, I claim as new and desire to secure by Letters Patent—

1. In an automatic fire-extinguisher, the combination, with an extinguisher-body having oppositely-disposed discharge-openings and valves for said openings, of a separable holding-connection for the said valves, composed of two members interposed between each pair of the discharge-openings, and arranged in approximate alignment with such openings, the contiguous ends of said members being united by solder, and their opposite ends resting against the valves, substantially as described.

2. In an automatic fire-extinguisher, the combination, with an outlet, of a cap held against the outlet to close the same by the posts F and G, arranged in approximate alignment with the outlet, and secured together by solder, as described.

3. The combination, with the inlet A and the two outlets C C, constructed to discharge two streams so as to impinge one against the other, of the caps D D, posts F G, secured together by solder, and means for adjusting the same, as described.

4. The combination, with the outlets C C, of the caps D D, the screw-threaded cap E, the post F, provided with the shoulder $f$, and the post G, secured to the post F by solder, as described.

In witness whereof I have hereunto set my hand.

JOSEPH R. BROWN.

Witnesses:
M. F. BLIGH,
J. A. MILLER, Jr.